(12) United States Patent
Rembarz et al.

(10) Patent No.: US 8,848,923 B2
(45) Date of Patent: Sep. 30, 2014

(54) KEY DISTRIBUTION SCHEME FOR NETWORKS OF INFORMATION

(75) Inventors: Rene Rembarz, Aachen (DE); Daniel Catrein, Würselen (DE); Frank Hartung, Herzogenrath (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 387 days.

(21) Appl. No.: 13/139,399

(22) PCT Filed: Jun. 5, 2009

(86) PCT No.: PCT/EP2009/056934
§ 371 (c)(1),
(2), (4) Date: Nov. 3, 2011

(87) PCT Pub. No.: WO2010/069617
PCT Pub. Date: Jun. 24, 2010

(65) Prior Publication Data
US 2012/0045064 A1  Feb. 23, 2012

Related U.S. Application Data

(60) Provisional application No. 61/122,493, filed on Dec. 15, 2008.

(51) Int. Cl.
*H04L 9/08* (2006.01)
*H04L 29/08* (2006.01)
*H04L 29/06* (2006.01)

(52) U.S. Cl.
CPC .............. *H04L 9/083* (2013.01); *H04L 9/0822* (2013.01); *H04L 63/0823* (2013.01); *H04L 63/062* (2013.01); *H04L 2463/062* (2013.01); *H04L 67/06* (2013.01); *H04L 63/104* (2013.01)
USPC ............................ 380/281; 380/279; 380/280

(58) Field of Classification Search
USPC .......................................... 380/281, 279, 280
See application file for complete search history.

(56) References Cited

U.S. PATENT DOCUMENTS 7,319,759 B1   1/2008  Peinado et al.
7,590,843 B1 *  9/2009  Khalil et al. .................. 713/171
(Continued)

FOREIGN PATENT DOCUMENTS

EP   1480100 A1   11/2004

OTHER PUBLICATIONS

Dannewitz, C. et al. "Scenarios and Research Issues for a Network of Information." 4th International ICST Mobile Multimedia Communications Conference, Jul. 7, 2008.
(Continued)

*Primary Examiner* — Brandon Hoffman
*Assistant Examiner* — Samuel Ambaye
(74) *Attorney, Agent, or Firm* — Coats & Bennett, PLLC

(57) ABSTRACT

A method for controlling information object (102) usage in a network of information (100) wherein information objects (102) are identified by information object identities and locations of the information objects (102) are indicated by location pointing information, the method comprising receiving (5b) an encrypted information object (102), sending (7) to a resolution node (D200) a request for location pointing information of a key issuing node (D300), the request comprising an identity of the received information object (102), receiving (8) the location pointing information of the key issuing node (D300), sending (9) to the key issuing node (D300) a request for an access key (104) for decrypting the encrypted information object (102), the request comprising the identity of the received information object (102), receiving (11) the access key (104), and decrypting (12) the received encrypted information object (102) with the received access key (104).

27 Claims, 9 Drawing Sheets

(56) References Cited

U.S. PATENT DOCUMENTS

2008/0010207 A1* 1/2008 Yanagihara et al. ............ 705/51
2008/0072296 A1  3/2008 Bensimon et al.
2008/0181414 A1* 7/2008 Deaver et al. ................ 380/279

OTHER PUBLICATIONS

Ahlgren, B. et al. "Design Considerations for a Network of Information." CoNEXT, 2008.

Jacobson, V. et al. "Content-Centric Networking." Whitepaper Describing Future Assurable Global Network, Jan. 30, 2007.

Moskowitz, R. et al. "Host Identity Protocol (HIP) Architecture." IETF Network Working Group, Request for Comments: 4423, Category: Informational, May 2006.

Stoica, I. et al. "Internet Indirection Infrastructure." IEEE/ACM Transactions on Networking, vol. 12, No. 2, Apr. 2004.

Author Unknown. "Seventh Framework Programme, Objective ICT-2007.1.1, The Network of the Future." Grant agreement for: Large-scale integration project, Annex I—"Description of Work", Nov. 2007.

Author Unknown. "PSIRP, Publish Subscribe Internet Routing Paradigm, FP7-INFSO-IST-216173." Deliverable D2.2, Conceptual Architecture of PSIRP Including Subcomponent Descriptions, Version 1.1, Aug. 2008.

Pan, J. et al. "An Overview of DNS-Based Server Selections in Content Distribution Networks." Computer Networks, vol. 43, 2003.

* cited by examiner

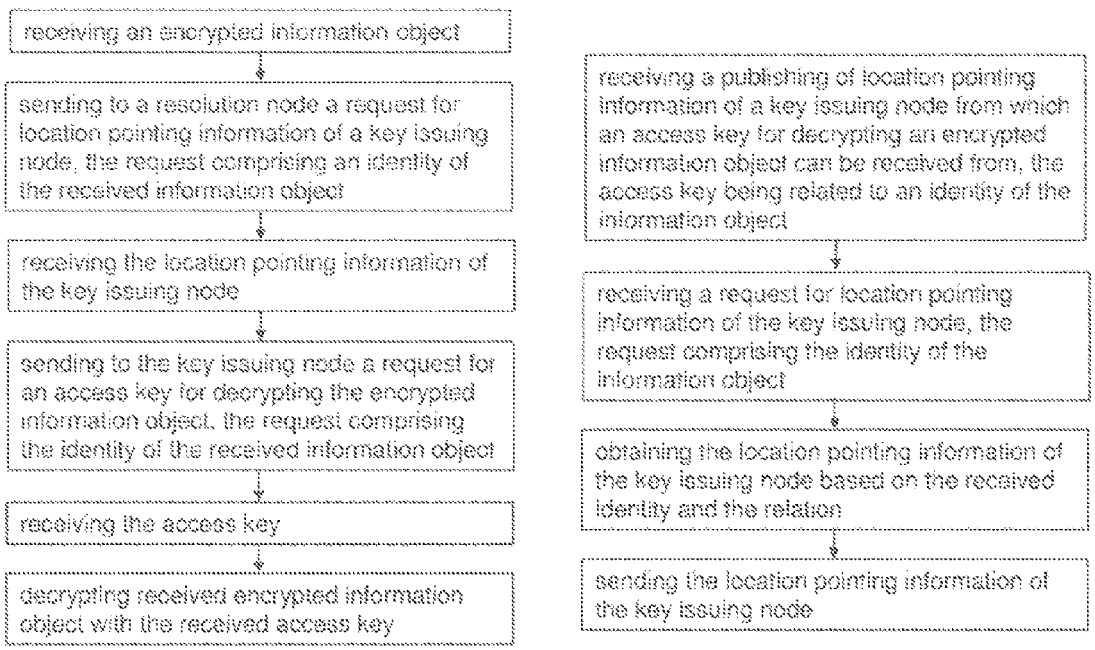

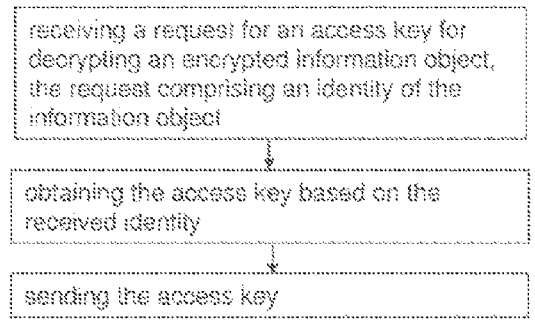

KEY DISTRIBUTION SCHEME FOR NETWORKS OF INFORMATION

This application claims the benefit of the filing date of U.S. Provisional Patent Application No. 61/122,493 filed Dec. 15, 2008, the disclosure of which is hereby incorporated herein by reference.

TECHNICAL FIELD

The invention relates to communication, especially to methods for controlling information object usage in a network of information, nodes adapted to perform such methods, computer programs adapted to perform such methods, and a computer-readable medium product comprising such computer programs.

BACKGROUND

Usage characteristics in the Internet have significantly changed over the years. The Internet has been designed for point-to-point connections, such as downloading content from a particular server, accessing an email server or, lately, having a voice over IP conversation. For these applications, having exactly the right endpoints in a connection is a requirement. Routing of messages between the endpoints is typically based on Internet Protocol (IP) addresses, which are also often used to identify the node, for instance directly or via a Domain Name System (DNS) translation.

Increasing mobility of users along with the trend to multi-homing and multi-access have soon made it clear that the semantic overloading of the IP address as both network locator and node identifier is problematic. Proposals like the Host Identity Protocol, HIP, (compare R. Moskowitz and P. Nikander, "Host Identity Protocol Architecture", RFC 4423) or the Internet Indirection Architecture, i3, (compare Ion Stoica, Daniel Adkins, Shelley Zhuang, Scott Shenker, Sonesh Surana, "Internet Indirection Infrastructure", SIGCOMM 2002) have addressed this by decoupling the identity of the node from its location in the network. The identity of the node is expressed by an identifier that can eventually be re-solved into the network address a node is currently reachable at. Additionally, host identities can have cryptographic properties, such as the 128 bit Host Identity Tag in HIP which is a hash over the public part of an asymmetric key pair also used for authentication and encryption.

Today, one can observe a new paradigm shift: The trend to so-called dissemination traffic, i.e. operations such as retrieving a website or downloading a video. In contrast to the classical point-to-point connections, where the source and the destination addresses are essential parts of the communication, dissemination traffic has different characteristics. In most cases it is not relevant who delivers the desired content, as long as it can be assured that it is the correct content.

A common way of addressing online content is the Uniform Resource Identifier (URI) which is often semantically overloaded, similar to the IP address that was to serve both as a network locator and node identifier. In many cases, the URI a user enters into his browser (for instance http://www.4ward-project.eu/index.html) is used as an opaque identifier for a piece of information (in this case the 4WARD homepage). The URI is resolved into the actual host serving the request by mechanisms like DNS round-robin schemes for load balancing or more sophisticated schemes as in Content Distribution Net-works like Akamai (compare J. Pan, Y. T. Hou, and B. Li, "An overview of DNS-based server selections in content distribution networks", Computer Networks, 43(6):695-711, 2003). Another more extreme example is the well-known peer-to-peer distribution scheme. Here, clients jointly "host" a shared resource, for instance, a video file, and the question which of the different download sources serves the request becomes less relevant or even completely irrelevant.

What these examples have in common is that the content, or in other words the information, moves to the center stage. Driven by this trend, the networking research community has lately started investigating so-called content-centric or information-centric networks (compare V. Jacobson, M. Mosko, D. Smetters, and J. Garcia-Luna-Aceves, "Content-centric networking", Whitepaper, Palo Alto Research Center, January 2007; PSRIP Deliverable D2.2, "Conceptual Architecture of PSIRP Including Subcomponent Descriptions", August 2008, available online at http://psirp.org). A gist of such a concept is that information objects become the first order elements in the network, i.e. the routing layer is aware of the content that is transported. This opens the door to many optimizations not possible today, such as optimized routing or transparent caching.

The 4WARD Future Internet project (compare FP7 4WARD project homepage, http://4ward-project.eu) has even broadened the scope of information-centric networking, so that also non-dissemination traffic (such as a voice call), network services or the virtual representations of real-world objects (such as the Eiffel tower) shall be handled. Also user identities can be mapped into the NetInf (Networks of Information) namespace using the real-world object representation, so that for instance a government-issued signature card can securely be mapped into the virtual world. The corresponding concept is referred to as Networks of Information, NetInf (compare C. Dannewitz, K. Pentikousis, R. Rembarz, E. Renault, O. Strandberg and J. Ubillos, "Scenarios and research issues for a Network of Information", In Proc. 4th Int. Mobile Multimedia Communications Conf., Oulu, Finland, July 2008; B. Ahlgren, M. D'Ambrosio, C. Dannewitz, M. Marchisio, I. Marsh, B. Ohlman, K. Pentikousis, R. Rembarz, O. Strandberg, V. Vercellone, "Design Considerations for a Network of Information", in Proc. ReArch. 2008, Re-Architecting the Internet Workshop, Madrid, Spain, December 2008).

A gist that influences the overall architecture is the identifier/locator split. In NetInf, the functional over-loading of IP addresses or URIs acting as both identifiers and locators may be eliminated via a clean split of those two functions. Each object will have one or more locators pointing at the location of a piece of information in the network and a separate identifier, enabling the persistent identification of the object regardless of possible location changes or replication in the network. In order to make this system work, the bindings and indirections between the different objects need to be handled efficiently; this task is carried out by an NR (Name Resolver/Name Resolution) entity, also denoted as resolution node. Details about the NetInf architecture, including the naming scheme, the name resolution framework and the object model are available in C. Dannewitz, K. Pentikousis, R. Rembarz, E. Renault, O. Strandberg and J. Ubillos, "Scenarios and research issues for a Network of Information", In Proc. 4th Int. Mobile Multimedia Communications Conf., Oulu, Finland, July 2008, and B. Ahlgren, M. D'Ambrosio, C. Dannewitz, M. Marchisio, I. Marsh, B. Ohlman, K. Pentikousis, R. Rembarz, O. Strandberg, V. Vercellone, "Design Considerations for a Network of Information", in Proc. ReArch. 2008, Re-Architecting the Internet Workshop, Madrid, Spain, December 2008.

In the context of this application, the term "network of information" (NetInf) may hence particularly denote a communication network in which a plurality of communicatively coupled nodes are provided and which is based on an information-centric architecture in which a provisioning of information objects is possible based on an identity identifying a specific information object and based on a locator specifying a location at which the specific information object is available. Such a network of information may involve wired and/or wireless communication between the various nodes.

The term "node" may particularly denote a communication partner device which may be configured for communication with one or more other communication partner devices in a network. For instance, such a node may be a user equipment to be operated by a user and to be coupled to a communication network. Examples are mobile phones, laptops or personal computers, data cards for plugging or on-board integration into laptops or personal computers, personal digital assistants (PDAs), navigation systems, portable game consoles, etc. Hence, mobile (for example portable) or stationary communication devices can be operated in accordance with a corresponding communication architecture. For instance, such a communication device may be used in the context of telecommunications.

The term "information object" may particularly denote a set of data representing information content or use data (for instance text such as a database or a story or an article, or multimedia content such as music data, video data, or any other information related to a service or an application) which can be requested by one node and provided by another node communicatively coupled to one other node in a network of information. Such an information object may be characterized for communication purposes by an information object identity in combination with corresponding location pointing information.

The term "information object identity" may particularly denote an unambiguous (for example unique) identifier of an information object which can be used for identifying an information object during communication of different nodes of a network of information and which can be used for distinguishing between an information object and other information objects. In other words, such an information object identity may be considered as a name of a corresponding information object.

The term "location pointing information" may particularly denote a locator item (such as data block serving as an address of a node at which the corresponding information object is available) pointing at a location (such as a node capable of providing specific data) of an information object in a network of information. Such an address may be for instance an Internet Protocol (IP) address being a numerical identification (logical address) that can be assigned to devices participating in a computer network utilizing the Internet Protocol for communication between its nodes. Location pointing information may provide a link to a node at which a specific information object is available for download. In other words, such a location pointing information may be considered as an address of a corresponding information object.

The term "resolution node" may particularly denote a name resolver node in a network of information. A publishing initiation node may provide the resolution node with location pointing information regarding a corresponding information object. The latter can be provided by the publishing initiation node upon request of an information object requesting node. Hence, a resolution node may manage or handle data blocks each of which including an indication at which location or node of a network of information an information object or other piece of data is available. Such a resolution node may be configured for receiving such data blocks from a publishing initiation node offering a corresponding service and may be configured for transmitting such data blocks to an information object requesting node requesting a corresponding service.

The term "publishing initiation node" may particularly denote a node in a network of information which node which can indicate to the resolution node an information object in conjunction with an assigned locator and may therefore fore indicate which piece of information is available where in a network. The publishing initiation node may be at the same time the provider of a corresponding information object itself or may be another communication entity.

The term "information object requesting node" may particularly denote a node in a network of information which node may search for a location of a specific information object in a network of information. For this purpose, the information object requesting node may send a query to a resolution node and may ask the latter for a location of a node offering a corresponding service of providing the desired information object.

Now referring to FIG. 7, in order make an information object 708 known in a network of information 700, information object 708 has to be published. As illustrated by a dashed line in FIG. 7, publishing may be done by sending a PUBLISH message P1 to a name resolver (NR) 702 stating that the information object 708 designated by an identifier $ID_{Obj}$ is available at a network location designated by $Loc_{Obj}$. The abbreviation Loc denotes a locator (also called location pointing information herein). Such a locator points at a location of a data object 708 in network 700, for instance it denotes a network address, for example an IP address. In that sense, the notation "$ID_{Obj}@Loc_{Obj}$" can be understood that an information object "Obj" with an identifier "$ID_{Obj}$" is available at (or can be requested via) a network of information location designated by location pointing information "$Loc_{Obj}$".

According to NetInf, each object 708 may have one or more locators pointing at the location of a piece of information in the network 700 and an identifier $ID_{Obj}$, enabling the persistent identification of the information object 708 regardless of possible location changes or replication in the network 700.

Here, $Loc_{Obj}$, can also be a list of locations. If the information object 708 has already been published before, the additional location is added or updated in the database. If this is the first registration, a new entry is created.

Solid lines in FIG. 7 illustrate the process of retrieving a file from the NetInf network 700. As outlined above, a gist is that a user 706 requests information by its ID (Identifier), without knowing (and bothering) from which node 704 at which location it will be served. It does not matter how the ID is obtained, for instance via a link in an email or some sort of search operation.

In order to retrieve a file, what in a first step client 706 has to perform is to resolve the identifier $ID_{Obj}$ of the information object 708 into its locator $Loc_{Obj}$ by contacting NR 702 (steps R1 and R2). In FIG. 7 this is done by a name resolution client (NRC) located on the client 706. After the location is known, the client 706 can proceed and retrieve the information object 708 from node 704, i.e. the actual storage location $Loc_{Obj}$ (steps R3 and R4).

While the former case is more likely to be used when NetInf is deployed in connection with IP, native NetInf-enabled networks also make it possible to handle the name resolution in the network, i.e. by one or more NetInf aware routers which contact the NR and request a storage location. This can for instance be realized by an NRC entity present on the first hop router and/or further routers in the network. The request can then—as in the above example—be routed to the storage location.

Once a client has retrieved a file, it can be published again, similar as in peer-to-peer networks. Optional encryption ensures that only authorized parties can access the actual data. Otherwise, the intention is to enable data to roam around freely in order to support replication, caching and other optimizations.

The fact that information objects can float around freely in the network is a central element of the information-centric paradigm. The fact that also the routing infrastructure identifies what data it is transporting is a key to the optimizations envisaged by NetInf. As the source of the download is not pre-determined in NetInf, current schemes based on securing the channel between the hosts do not apply anymore. Thus, it may be desired to secure access to the object itself.

Simple approaches might include password-based encryption or the use of pre-shared keys. This might work on the small scale, but also here the secrets (password, key) need to be distributed.

There may be a need for providing a securely operable network of information.

SUMMARY

It is an object of the invention to enable a secure communication in an information-centric communication network.

In order to achieve the object defined above, methods for controlling information object usage in a network of information, nodes adapted to perform such methods, computer programs adapted to perform such methods, and a computer-readable medium product comprising such a computer program according to the independent claims are provided.

According to an exemplary embodiment of the invention, a method (for instance for operating an information object requesting node) for controlling information object usage in a network of information is provided. Information objects are identified by information object identities and locations of the information objects are indicated by location pointing information. The method comprises the steps of receiving an encrypted information object and sending to a resolution node a request for location pointing information of a key issuing node (for instance Key Management, KM, is an example for a key issuing node, a Rights Issuer, RI, may be regarded as a KM that in addition can also provide access rights for instance in form of policies). The request comprises an identity of the received information object. The method further comprises receiving the location pointing information of the key issuing node, sending to the key issuing node a request for an access key for decrypting the encrypted information object, the request comprising the identity of the received information object, receiving the access key, and decrypting the received encrypted information object with the received access key.

According to another exemplary embodiment of the invention, a method (for instance for operating a resolution node) for controlling information object usage in a network of information is provided. Information objects are identified by information object identities and locations of the information objects are indicated by location pointing information. The method comprises the steps of receiving a publishing of location pointing information of a key issuing node from which an access key for decrypting an encrypted information object can be received from, the access key being related to an identity of the information object, and receiving a request for location pointing information of the key issuing node, the request comprising the identity of the information object. The method further comprises obtaining the location pointing information of the key issuing node based on the received identity and the relation, and sending the location pointing information of the key issuing node.

According to still another exemplary embodiment of the invention, a method (for instance for operating a key issuing node) for controlling information object usage in a network of information is provided. Information objects are identified by information object identities and locations of the information objects are indicated by location pointing information. The method comprises the steps of receiving a request for an access key for decrypting an encrypted information object, the request comprising an identity of the information object, obtaining the access key based on the received identity, and sending the access key.

According to yet another exemplary embodiment of the invention, a method (for instance for operating a publishing initiation node) for controlling information object usage in a network of information is provided. Information objects are identified by information object identities and locations of the information objects are indicated by location pointing information. The method comprises the step of initiating a publishing of location pointing information of a key issuing node, the key issuing node being a node from which an access key for decrypting an encrypted information object can be received from. The access key is related to an identity of the information object.

According to yet another exemplary embodiment of the invention, a corresponding node (such as an information object requesting node, a resolution node, a key issuing node, or a publishing initiation node) is provided which is adapted to perform the steps of one of the methods having the above mentioned features.

According to still another exemplary embodiment of the invention, a computer program is provided comprising code adapted to perform the steps of one of the above methods having the above mentioned features when loaded into a processing unit of a node.

According to yet another exemplary embodiment of the invention, a computer-readable medium product is provided which comprises at least one computer program having the above mentioned features.

Embodiments of the present invention also concern computer programs comprising portions of software codes in order to implement the methods as described above when operated at a respective device. A computer program can be stored on a computer readable medium. A computer-readable medium can be a permanent or rewritable memory within a respective device or located externally. A computer program can be also transferred to a respective device for example via a cable or a wireless link as a sequence of signals.

Data processing which may be performed according to embodiments of the invention can be realized by a computer program, that is by software, or by using one or more special electronic optimization circuits, that is in hardware, or in hybrid form, that is by means of software components and hardware components.

The explanations of various NetInf terms in the section "Background" also apply to exemplary embodiments of the invention.

Moreover, in the context of this application, the term "encrypted information object" may particularly denote a set of data representing information content which can be requested by one node and provided by another node communicatively coupled in a network of information in a partially or completely encrypted (or encoded) manner. Such an encryption may be of such kind that access to the information included in the information object is only possible for a node having or having access to necessary decryption information (such as a password, a key, or any other security code). Hence, knowing the necessary decryption information may allow a node to decrypt (or decode) the encrypted information object thereby converting it into a directly or after subsequent modification usable form such as plaintext or executable code.

The term "key issuing node" may particularly denote a node (such as a key management node) in a network of information which is capable of managing or handling keys required for converting an encrypted information object into a decrypted information object for subsequent use. Such a key issuing node may be provided as a separate node in a network of information or may be realized as a part of a node used also for other purposes in a network of information (such as a resolution node, a publishing initiation node or even an information object requesting node). Such a key issuing node may optionally also function as a rights issuer providing access rights in form of policies or the like.

The term "encrypted object receiving and decrypting node" may particularly denote a communication partner device of a network of information which may query such a network first for identifying a location at which a desired information object is available and then for identifying a location at which an access key necessary for decrypting the desired encrypted information object is available. Both these items of information may then be downloaded by the encrypted object receiving and decrypting node for subsequently decrypting the previously received encrypted information object using the previously received access key.

The term "access key" may particularly denote any data block such as a password, a cryptographic key, or any other security code which may be secret and may be only provided to a user or node being authorized for access to encrypted information which can only be decrypted with the access key.

The term "publishing of location pointing information of a key issuing node" may particularly denote an activity of a node in a network of information which may include the provision of an address of a node (such as a key issuing node) at which an access key for decrypting an encrypted information object is available. Such an indication may be supplied by the node to the resolution node in a message together with (or in a message separately from) publishing an information object identifier in conjunction with an assigned locator.

According to an exemplary embodiment of the invention, the concept of a Network of Information (NetInf) may be rendered more secure to also allow the distribution of protected information objects and the keys governing access to the information objects. In an embodiment, access keys may be distributed directly between a source and a sink, or using a trusted key management service. An embodiment of the invention thus enables additional functionality in a Network of Information. For a powerful and widely applicable network architecture, a corresponding general key distribution architecture may be advantageous. Such a system may have an enormous responsibility and may be capable to handle access keys and possibly corresponding access rights in a secure, reliable and scalable way. Moreover, such a procedure is considered practical for day-to-day use and, due to its simplicity, is considered to have a proper chance to be accepted by users and widely adopted.

In the following, further exemplary embodiments of the methods for controlling information object usage in a network of information will be explained. However, these embodiments also apply to the respective nodes, to the respective computer programs, and to the computer-readable medium product.

A further embodiment of the invention relates to key management and key distribution for encrypted information objects.

In an embodiment, the encrypted information object can be duplicated and be stored in different places in the network, for instance one or more caches. In this case the potentially large information object can be retrieved in an optimized manner from such a cache, the usually small key information may be retrieved from the key managing (which may also be denoted as key issuing) node (for instance the publishing initiation node).

In general, it may be desired to be able to store and manage the key information in multiple places, in order to avoid overload of the publishing node. A transfer of the access key to a trusted key management service, which can then serve as alternative source for the key information is a further aspect of an embodiment of the invention.

The method of operating an information object requesting node (which may also be denoted as encrypted object receiving and decrypting node) may involve managing the received access key which is encrypted with a key encryption key. Such a method may further comprise obtaining the key decryption key and subsequently decrypting the encrypted access key with the key description key. In such an embodiment, not only the information object may be encrypted, but also the access key required for decrypting the encrypted information object. Taking such a measure may further improve the security of operating the system.

Additionally, such a method may comprise sending to the key issuing node at least one parameter for generation or identification (particularly if a key encryption key has been generated before and is stored in a storage device or the like) of the key encryption key. Such a parameter may be sent to the key issuing node by the information object requesting node. This may improve security of a communication between these nodes when exchanging communication messages for transmitting the encryption key.

It is also possible that the method comprises sending to the key issuing node at least one parameter for an authorization of an entity associated with a node receiving and decrypting the encrypted information object (which may be denoted as well as an encrypted content receiving and decrypting node). In this context, it should be mentioned that such an encrypted content receiving and decrypting node may be embodied as a user device of a user requesting a certain information object. Such a user device (denoted as user B device in the figures) is an example for an encrypted information object receiving and decrypting node. An entity associated with said node may be the node itself or one or more users (also denoted as operators) of said node. The parameters mentioned above may be derived from a group of parameters comprising an identity associated with an operator (also denoted as a user) of an encrypted content receiving and decrypting node, an identity of said node itself, a certificate of said operator, a certificate of said node, role assertion information related to the operator, role assertion information related to said node, a proof for at least one of the role asserted information, and cryptographical freshness information, etc. By taking this measure, unauthorized access of non-authorized entities to content in a communication network may be prevented.

Still referring to the method of operating the information object requesting node, such a method may also include receiving policy information indicating at least one usage right (for instance permission, restriction, or limited permission with a specific restriction) of the decrypted information object, and using the decrypted information object according to the received at least one usage right. Therefore, a key issuing node may also serve for managing (or even defining) a policy according to which policy information is provided to requesting communication nodes desiring access to an information object.

In the following, exemplary embodiments of the method of operating the key issuing node will be explained.

Such a method may also comprise obtaining a key encryption key, and encrypting the access key with the key encryption key. In such an embodiment, the requested access key is not transmitted to an information object requesting node in plaintext or in an unencrypted way, but is also encrypted to thereby increase safety of operation of the system and preventing misuse.

The method may further comprise receiving from an encrypted content receiving and decrypting node, for instance denoted as user B device in the figures, at least one parameter for the generation or identification (particularly if a key encryption key has been generated before and is stored in a storage device or the like) of the key encryption key. Such a parameter may be one of the parameters mentioned above in the context of the method of operating an information object requesting node. These and/or other parameters may be used to increase safety of operation of the system.

The method may further comprise receiving from an encrypted content receiving and decrypting node, for instance the node denoted as user B device in the figures, at least one parameter for an authorization of an entity associated with the node receiving and decrypting the encrypted information object. An entity associated with a node for receiving and decrypting the encrypted information object may be the node itself or one or more users (which may also be denoted as operators) of said node. Parameters may be derived from a group of parameters comprising an identity associated with an operator (also denoted as a user) of a node receiving and decrypting the encrypted information object, an identity of said node itself, a certificate of said operator, a certificate of said node, role assertion information related to the operator, role assertion information related to the node, a proof for at least one of the role assertion information, and cryptographical freshness information. Of course, other kinds of parameters can also be used which are capable of ensuring data safety regarding the communication between the information object requesting node and the key issuing node.

In an embodiment, the described method may be performed at or by a key issuing node which may be provided separately from a node initiating a publishing of location pointing information of the key issuing node. By spatially, functionally and logically decoupling a key issuing task from a publishing initiation task, it may be made even more difficult for a potential invader to get access to confidential information.

The method may further comprise receiving a request for an access key issuing delegation from the publishing initiation node, sending a request for the access key to said publishing initiation node, and receiving the access key. An example for such a configuration can be seen in embodiment (1) of FIG. 4 (compare reference numerals 31 to 33). Taking these measures allows for a powerful and reliable delivery of an access key to a trusted key management service to which a key management may be advantageously delegated. In such an embodiment, a bidirectional exchange of communication messages between a key issuing node and a publishing initiation node may be sufficient for key delivery.

However, alternatively, it is possible—for delivering access keys to a key management service—to intercept a message from the publishing initiation node, the message comprising the access key for the encrypted information object, and to obtain or derive the access key from the intercepted message. Also such an embodiment, an example of which being indicated as embodiment (2) in FIG. 4 (compare reference numerals 41 to 43) may allow for a safe delivery of an access key to a key management service. In such an embodiment, a publishing initiation node may mark a key information message with a flag or the like for authorizing a traversed key issuing node to intercept the message.

According to another embodiment of delivering access keys to a key management service, a message from a publishing initiation node may be intercepted, the message comprising location pointing information identifying the publishing initiation node, may comprise sending a request for the access key to the publishing initiation node, and may comprise receiving the access key. Such a configuration is shown as embodiment (3) in FIG. 4 (compare reference numerals 51 to 54). The access key may be received from the publishing initiation node (that can also provide the encrypted information object) or from another node in possession of the access key to which the encrypted information object sending node can turn to for initiating a sending of the access key to the key issuing node.

Again referring to the above-described embodiments regarding interception, said message may comprise a delegation indicator (for instance a delegation allowed flag) authorizing a trusted key issuing node to intercept said message.

The method may further comprise sending location pointing information of the key issuing node and the identity of the information object to a resolution node. In this context, reference is made to reference numerals 44 and 55, respectively, in embodiments (2) and (3) of delivering access keys to a key management service in FIG. 4. Therefore, such key delivery procedures may be terminated with a corresponding publication.

Now referring to the above-described method of operating a publishing initiation node, it is possible that the publishing comprises sending a message. Therefore, the publication may be performed by transmitting a communication message from the publishing initiation node to a resolution node. Such a message may comprise the location pointing information and the identity of the information object. In other words, such a publication message may identify the information object in combination with an address of a node in the communication system at which this information object is available.

The message may additionally comprise the information at which node (for instance the key issuing node) a corresponding key for decrypting an encrypted information object is available. By sending both data items in one message, the publication may be rendered very efficiently and it may be possible to keep the traffic over the communication channel as small as possible.

It is also possible that the message itself comprises the access key. Therefore, together with the publication, also the access key may be communicated to a destination entity.

Still referring to the above embodiment, the access key may be encrypted with a key encryption key related to a key decryption key available to the key issuing node. Therefore, the communication of the access key may be performed in an encrypted manner so that the decryption of this access key requires knowledge of the key decryption key.

The message may comprise a delegation indicator (for instance a delegation allowed flag) based on which a trusted key issuing node may intercept said message.

The method may further comprise sending the encrypted information object, e.g. in response to a receipt of a corresponding request. The publishing initiation node may also send the encrypted information object to a requesting node. This however does not have to be the case for each and every encrypted information object delivery to an encrypted object receiving and decryption node as this node can receive the encrypted information object for instance from a cache or from another third party other than a publishing initiation node (denoted as user A device in the figures). In an embodiment, such a publishing initiation node or user A device may initially serve for performing one, multiple, or all of the following roles:

Entity that sends the encrypted information object to an information object requesting node (also denoted as a user B device in the figures)

Entity that issues the access key

Entity that initiates the publishing of the location pointing information of the information object and the key issuing node together with respective identities (the publishing initiation node may act as a temporary or permanent key issuing node as issuing the access key may be performed initially by the publishing initiation node).

The publishing initiation node may delegate key issuing to a key issuing node separate from the publishing initiation node. Additionally or alternatively, publishing initiation node may delegate the sending of the encrypted object to a cache or any other intermediate entity.

Anyone of the above-described nodes (such as information object requesting node, resolution node, key issuing node, publishing initiation node, cache) may comprise a receiving unit, a sending unit, a processing unit and/or a storage unit. A receiving unit may be a communication interface adapted for receiving a communication message, for instance in a wireless or wired manner. A sending unit may be a communication interface adapted for transmitting a communication message to a communicatively coupled communication partner device or entity, for instance in a wired or wireless manner. The receiving unit and the sending unit may also be combined to a transceiver unit performing both tasks of receiving and sending communication messages. A processing unit may be a device which has processing capabilities and can perform calculations. Such a processing unit may be realized as a microprocessor or central processing unit, CPU, for instance. A storage unit may be an electronic memory device which is capable of storing data. Examples for such a storage unit are a harddisk or any semiconductor storage device.

The aspects defined above and further aspects of the invention are apparent from the examples of embodiment to be described hereinafter and are explained with reference to these examples of embodiment.

BRIEF DESCRIPTION OF THE DRAWINGS

Embodiments of the invention will be described in more detail hereinafter with reference to examples but to which the scope is not limited.

FIG. 6A to FIG. 6D illustrates flow diagrams of methods according to exemplary embodiments of the invention.

DETAILED DESCRIPTION

Figure 1:
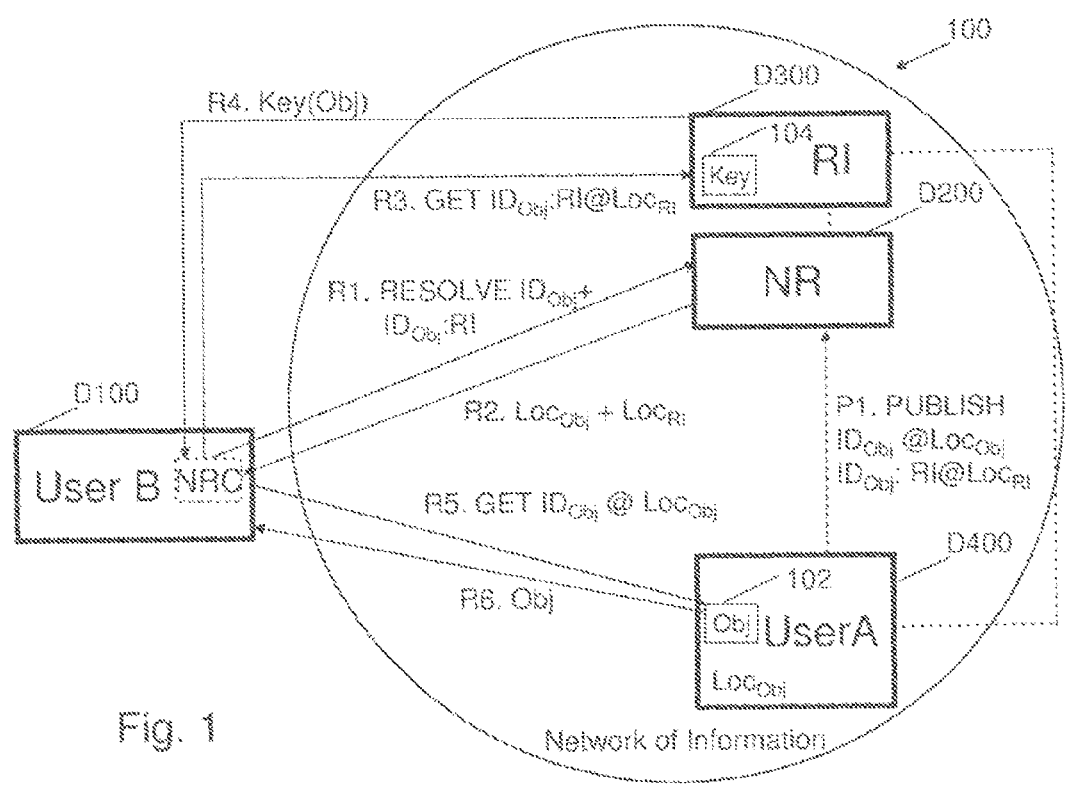
FIG. 1 illustrates secure publishing and retrieving information in a network of information system according to an exemplary embodiment of the invention.

The illustration in the drawing is schematically. In different drawings, similar or identical elements are provided with the same reference signs.

According to an embodiment, information objects can be encrypted and published, i.e. their identifier and location may be made known to an NR (name resolver) entity. In addition, a location of a rights issuer for providing an access key for this object can be published to the NR.

The encrypted information object can be received at a user device. The user device can request from NR the location of an access key by sending to the NR the identity of the encrypted object. The NR can obtain the location of the RI (rights issuer) from an association (or relation) of the received identifier to the location of RI based on the information provided in the publish phase. The NR may then return the obtained location of RI to the user device which in turn can contact the RI, obtain the access key and finally decrypt the encrypted content.

In the following, referring to FIG. 1, a network of information (NetInf) 100 according to an exemplary embodiment of the invention will be explained.

The network of information 100 is formed by a plurality of communicatively coupled communication partner devices, four of which being explicitly shown in FIG. 1. In other embodiments, a larger or smaller number of communication partner devices may be provided.

The network of information 100 is formed by a user A device D400 serving and operating as a publishing initiation node. The user A device D400 is communicatively coupled with a user B device D100 via a communication network such as the public Internet. In the described embodiment, user B device D100 serves and operates as an information object requesting node. Both the user A device D400 and the user B device D100 are communicatively coupled with a name resolver (NR) node D200 serving as a resolution node. Additionally, a rights issuer (RI) node D300 is provided in the network of information 100 and is communicatively coupled with nodes D100, D400 and D200. The RI node D300 serves as a key issuing node.

In the network of information 100 which is based on an information-centric or content-centric architecture, the user A device D400 e.g. according to the embodiment of FIG. 1 is capable of storing and providing an information object 102 to another one of the communicatively coupled entities of the network of information 100, particularly to the user B device D100 which is interested in this information object 102 in the described embodiment. The information object 102 may include multimedia data such a video stream being reproducible on the user B device D100.

The information object 102 can be downloaded by the user B device D100 only in an encrypted manner. Therefore, for getting access to the content of the information object 102, it is necessary for the user B device D100 to get access to both the information object 102 and an access key 104 which is managed by and stored at the location of the key issuing node D300 e.g. according to the embodiment of FIG. 1.

In the following, operation of the network of information 100 according to the described embodiment will be explained. The described embodiment only provides one possible example for a communication scheme between the entities D100, D200, D300 and D400, and various alternatives are possible. Particularly, it is possible that the tasks provided by several of the individual entities D100, D200, D300, D400 are performed by a multitask node. It is also possible that only a part of the communication paths shown in FIG. 1 are realized, so that not all of the nodes D100, D200, D300, D400 need to be communicatively coupled to one another in a direct manner. Further, the order of the sequence of procedural steps, as described in the following, may differ from the described embodiment.

In a method of controlling usage of the information object 102 in the network of information 100, the information object 102 may be identified by an information object identity $ID_{Obj}$. Therefore, when the nodes D100, D200, D300, D400 communicate with one another regarding the information object 102, this specific information object 102 may be unambiguously identified based on the information object identity $ID_{Obj}$. Furthermore, for communicating the information at which location the information object 102 is available (user A device D400 in FIG. 1), a locating pointing information $Loc_{Obj}$ may be used which specifies in the shown embodiment that the information object 102 is available at the user A device D400. In that sense, the notation "$ID_{Obj}@Loc_{Obj}$" can be understood that an information object "Obj" with an identifier "$ID_{Obj}$" is available at (or can be requested via) a network of information location designated by location pointing information "$Loc_{Obj}$".

In a procedure P1, user A device D400 takes the role of a publishing initiation node and initiates a publishing of identification information and location pointing information to resolution node D200. More precisely, the user A device D400 may communicate to the resolution node D200 during the procedure P1 that the user A device D400 is capable of making available the (encrypted) content of information object 102 to another node. For this purpose, the user A device D400 communicates to the resolution node D200 an identity (or an identifier) of the information object 102 as well as a location pointing information indicating that this object 102 is available at the location of the user A device D400. However, since the information object 102 is available in an encrypted form by user A device D400 only, the publishing procedure P1 further comprises an indication that the required access key 104 for decrypting the encrypted information object 102 is available at the location of the key issuing node D300 using notation "$ID_{Obj}:RI@Loc_{RI}$" with "$Loc_{RI}$" being the location pointing information of the key issuing node D300, here embodied in a RI node, to express that an access key for an encrypted information object "Obj" is available at (or can be requested via) a key issuing node at a network of information location designated by location pointing information "$Loc_{RI}$".

The key issuing node D300 is a node from which the access key 104 for decrypting the encrypted information object 102 can be received. The access key 104 is therefore related to the identity $ID_{Obj}$ of the information object 102.

After this publishing procedure P1, user B device D100 may start querying the network of information 100 in order to obtain information at which location encrypted information object 102 is available for download, and at which location the corresponding access key 104 is available which the user B device D100 needs to decrypt the encrypted content of the encrypted information object 102. For this purpose, in a procedure R1, the user B device D100 sends to the resolution node D200 a request to disclose location pointing information of the information object 102, wherein this request R1 comprises the identity $ID_{Obj}$ of the information object 102 desired by the user B device D100.

In response to the communication message R1, the resolution node D200 sends back to the user B device D100 a communication message R2 which includes the information that the information object 102 is presently available at the location of the user A device D400.

However, according to the described embodiment, the information object 102 is available from the user A device D400 in an encrypted form only, for the sake of security. Therefore, with the communication message R1 (or alternatively with a separate communication message), the user B device D100 may also request information where, i.e. at which location, the required access key 104 is available. In response to query R1 (or alternatively in response to a separate query), the resolution node D200 sends back also location pointing information of the key issuing node D300 storing the access key 104, which is logically correlated to the information object 102 of interest via the identifier $ID_{Obj}$.

Consequently, after the procedures R1, R2, the user B device D100 is aware of (i) the location of the encrypted information object 102 as well as (ii) the location of the access key 104 for decrypting the encrypted information object 102.

In order to download the access key 104 from the key issuing node D300, the user B device D100 then sends a communication message R3 to the key issuing node D300. With this request, the user B device D100 requests transmission of the access key 104 stored at the location of the key issuing node D300. Procedure R3 comprises sending to the key issuing node D300 a request for an access key 104 for decrypting the encrypted information object 102, the request comprising the identity $ID_{Obj}$ of the information object 102. because of a relation between IDobj and access key 104, the access key 104 can be retrieved or generated by the key issuing node 104. As a response to the communication message R3, the key issuing node D300 sends back, in a communication message R4, the (retrieved or generated) access key 104 (in plaintext or encrypted as well).

After (or alternatively before or simultaneously with) having received the access key 104, the user B device D100 may send a communication message R5 to the user A device D400 which is known to the user B device D100 as the communication entity at which the information object 102 is available. Message R5 may include the request to send the information object 102 to the user B device D100. In a reply message R6 in response to message R5, the encrypted object 102 is transmitted from the user A device D400 to the user B device D100.

Using the access key 104, the user B device D100 is then capable of decrypting the encrypted information object 102, therefore rendering the content of the information object 102 accessible to the user B device D100.

Various alternatives to the described communication scheme are possible. For instance, it is possible that procedures R5, R6 are performed before procedures R3, R4. It is also possible that the query for a location of the information object 102 and a query regarding a location of the corresponding access key 104 are not performed in a single common message R2, as shown in FIG. 1, but are separated into two different messages. It is also possible that the access key 104 is not sent from the key issuing node D300 to the user B device D400 in plaintext, but it can also be encrypted, for instance in such a way that only the user B device D100 can decrypt the encrypted access key 104. It is also possible that the access key 104 is not available via a separate key issuing node, but that the task of the key issuing node D300 is also provided by the user A device D400.

Figures 2A, 2B:
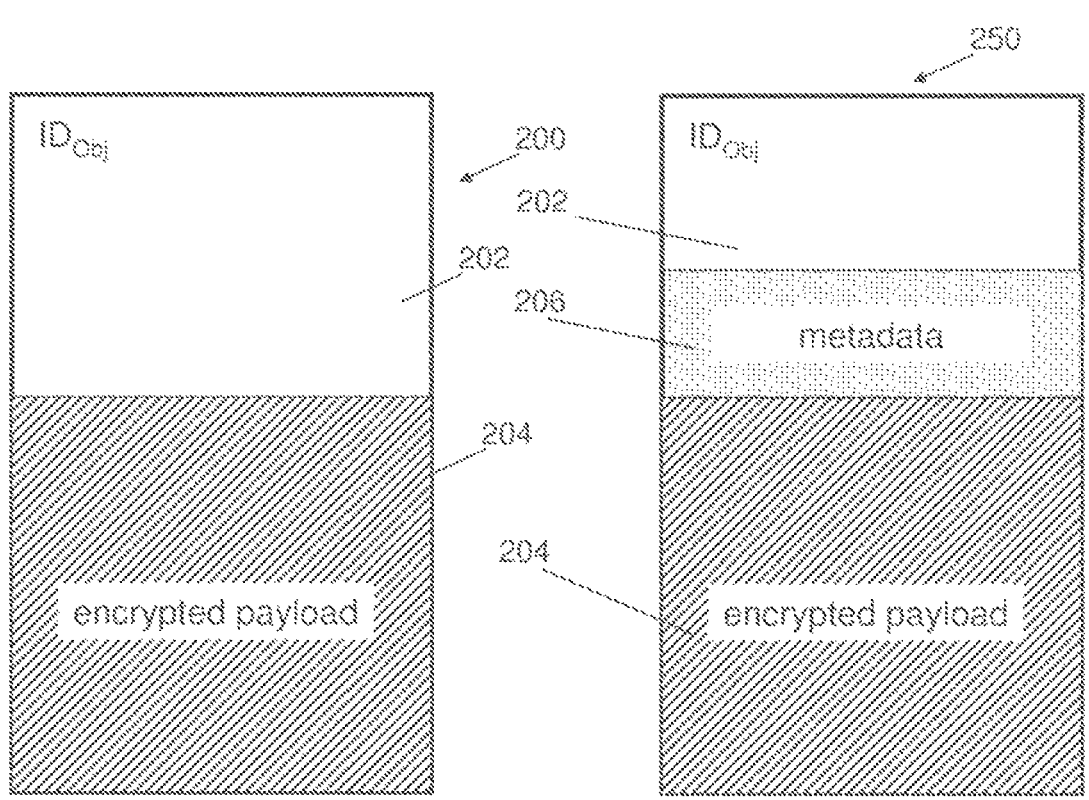
FIG. 2A and FIG. 2B illustrate embodiments of an encrypted information object according to exemplary embodiments of the invention.

FIG. 2A shows an embodiment of a data structure of encrypted information object 200 (which corresponds to reference numeral 102 in FIG. 1).

In this embodiment, encrypted information object 200 comprises an identification portion 202 comprising an identifier or identity $ID_{Obj}$ of the encrypted information object 200. Additionally, the encrypted information object 200 comprises an encrypted payload portion 204 which comprises the actual content or use data of the encrypted information object 200, for instance text data or reproducible audio content. The identifier $ID_{Obj}$ may be in plaintext or may be encrypted as well.

FIG. 2B shows a data structure of an encrypted information object 250 according to another exemplary embodiment. In addition to the typically plaintext identifier $ID_{Obj}$ in portion 202 and the encrypted payload in portion 204, the encrypted information object 250 may further comprise meta data in a portion 206. Meta data may for instance contain an indication that the information object 250 is (or parts thereof are) encrypted so that, in the embodiment of FIG. 1, user B device D100 may get the information that an access key 104 is necessary for decrypting the encrypted information object 250. The meta data 206 may be contained in the information object 250 as depicted in FIG. 2B or may be provided separately (not shown). The meta data 206 may for instance contain an indication that the object 250 is encrypted and a rights issuer (RI) D300 needs to be contacted (compare also step 7 in the embodiment of FIG. 3A).

In the following, an embodiment of the delivery of an encrypted information object 102 and a corresponding access key 104 directly from a user A device D400 to a user B device D100 will be explained.

Figure 3A:
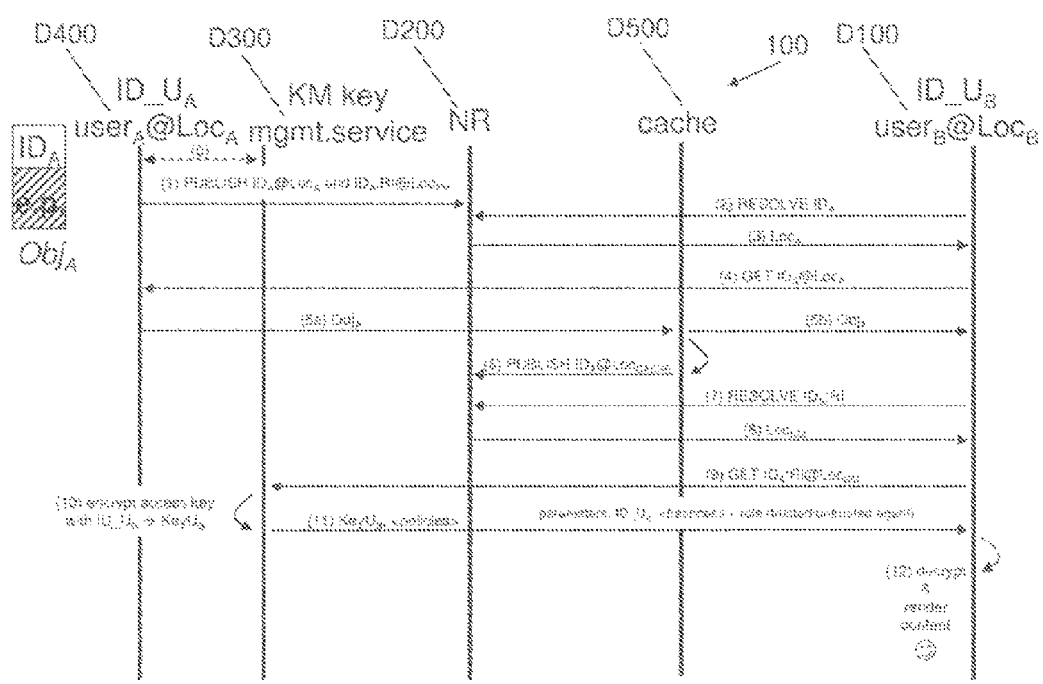
FIG. 3A and FIG. 3B illustrate examples of a message flow diagram for a delivery of encrypted information object and access key according to exemplary embodiments of the invention.

An encrypted information object with identifier $ID_A$, available at location $Loc_A$ and (possibly) produced by user A ($user_A$) with user ID $ID\_U_A$ is considered. FIG. 3A provides a graphical visualization of the actions described in this context with user A device D400 and user B device D100 also abbreviated as $user_A$ and $user_B$.

Figure 3B:
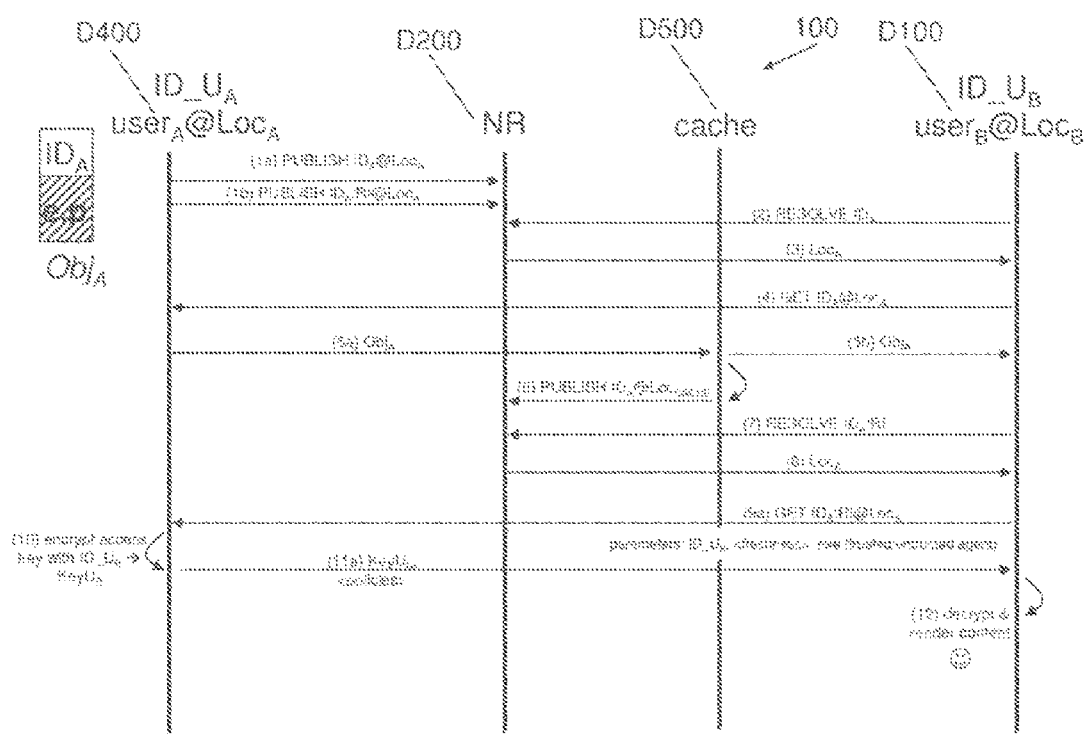

The following procedure can be carried out according to an exemplary embodiment of the invention:

Step 0: User A device D400 agrees with at least one key management service (KM) D300 that KM D300 shall act as a rights issuer (RI) on behalf of User A D400. This agreement is for now out of scope, but is described below in more detail. User A device D400 can also itself take the role of the KM D300. An embodiment of the latter, i.e. user A device D400 itself acting as an encrypted content provider and rights issuer to access the encrypted content in a controlled way, is depicted in FIG. 3B described below.

Step 1: To make the existence of the information object known, it is published to the NR D200. The publishing message indicates a relation between $ID_A$ and $Loc_A$, for instance it states $ID_A$ and $Loc_A$ being associated. The publishing message (or a separate one as for instance depicted in FIG. 3B) comprises further information about the location for the at least one Rights Issuer (RI) D300 for $ID_A$. RI D300 is an entity that can provide an access key to decrypt the encrypted object. The relation (or association) between the identifier of the encrypted object $ID_A$ and the location (locator $Loc_{KM}$) of the rights issuer D300 is expressed by $ID_A:RI@Loc_{KM}$. More than one such relation (association) may be published in a single or multiple PUBLISH messages.

Step 2/3: If a user B device D100 wants to receive the information object, $ID_A$ has to be known to it (by means that the skilled person is aware of but being out of scope here). User B device D100 will then send a resolution request to the NR D200, containing $ID_A$, and will receive location $Loc_A$.

Step 4/5: User B device D100 will then send a GET request to $Loc_A$, and will receive the information object, optionally via a cache D500 (see also step 6 below).

Alternatively, the encrypted object may be transferred to User B device D100 by any other means (might even include storing the file on a USB stick or any other data carrier), probably even without any request-response mechanism, i.e. steps (2)-(4) can be optional and the encrypted object A may be available to user device B D100 at location $Loc_B$.

Step 6: Alternatively, the content may have been received by a cache D500, transparently to the user. In this case, the NR D200 may return $LOC_{CACHE}$ instead of $Loc_A$ or as an alternative to $Loc_A$ in step (3). Step 6 shows an exemplary publish message stating that the cache D500 is an additional storage location for the object identified with $ID_A$.

Step 7: The information object may comprise a flag or another indication that it is encrypted, potentially as part of meta data, or this may be detectable by user B device D100 by other means. User B device D100 thus requires key information to decrypt and possibly use the information. User B device D100 first requests resolution of the RI (or identification, for instance if it has been generated before and is stored in a storage device or database) for $ID_A$ from NR D200, denoted RESOLVE $ID_A$: RI in FIG. 3. The valid one or more RIs D300 for IDA have been registered with NR D200 during the initial publish (see for instance the paragraph above).

Step 8: The NR D200 returns one or more locators $Loc_{KM}$. (corresponding to $Loc_A$ in FIG. 3B as user device A D400 comprises also the RI D300 (KM key mgmt.service) functionality in FIG. 3B).

Step 9: User B device D100 now requests key information for $ID_A$ from RI D300 (KM D300 being the key management service) at location $Loc_{KM}$ expressed in the example of FIG. 3A as GET $ID_A:RI@Loc_{KM}$. In the request, one or more parameters can be conveyed in addition, namely for instance one or more of an ID of user B ($ID\_U_B$) or user B device ID (not shown in FIG. 3A and FIG. 3B), a desired role assertion (for instance trusted_agent, untrusted_agent), and cryptographical freshness information (a trusted signed time, or a nonce). In addition, the request may contain a proof for the role assertion, for instance a signed role certification.

Step 10: Upon authorization of User B and/or user B device D100 (by for instance verifying at least one of the aforementioned parameters), KM key management service can proceed to package and encrypt the access key(s) for User B using a suitable mechanism. This can be done by applying identity based encryption, using for instance $ID\_U_B$; or by applying public key encryption, using for instance a public key of User B (in this case, the certificate of User B was also a parameter in the request of step 9). In a corresponding manner user B device authorization and/or encryption can be performed based on an identity of device B and/or a certificate of device B). Also a concatenation of multiple encryption steps is possible, for instance for a combination of user-based and device-based encryption. In this example, the access key is for example first encrypted for device B and then for user B (or the other way around). Consequently, only user B using device B can decrypt the access key.

Step 11: The protected key can be delivered optionally together with usage policies. These may contain for instance an expression of the usage rights User B has.

Step 12: User B can decrypt the protected access key and can use it to decrypt and use the encrypted information object according to the usage policies. How this is done depends on the encryption scheme used in step 10. In the example of public/private key encoding, the KM D300 may encrypt the access key with the public key of user$_B$, and the user may decrypt it with the corresponding private key which is only available to user$_B$.

User B authorization as well as user B specific encryption of the access key are optional but may advantageously form a part of a powerful implementation, as they may significantly enhance the level of security.

Since the information used in the NR D200 could be misused to direct requests to a false RI D300, it may be advantageous to protect it against unauthorized manipulation. For example, there can be a condition that the information in NR D200 can only be modified by authorized entities for instance the originating node (User A). NR D200 may check the condition (for instance may verify a cryptographic signature) before allowing a modification of the relation between ID$_A$ and at least one Loc$_{KM}$.

The communication architecture shown in FIG. 3B differs from the communication architecture shown in FIG. 3A particularly in that the publishing procedure (1) is separated into two different publishing procedures (1$a$) related to the publication of information regarding the information object 102 and a publishing procedure (1$b$) related to a publication of a location of an access key 104. Furthermore, the communication procedure (9) between nodes D100 and D300 is substituted by a corresponding communication (9$a$) between nodes D100 and D400. The same holds for a procedure (11$a$) regarding a communication between nodes D100 and D400 which substitutes the communication between nodes D100 and D300 in FIG. 3A. A separate key issuing node D300 is omitted in FIG. 3B, and key issuing tasks are provided by node D400.

Next, examples for delivery of an access key to a key management service according to exemplary embodiments will be explained.

The user-to-user scenario described previously allows publishing protected information objects in a network of information. However, all key requests need to be handled by the managing (i.e. typically the originating as for instance depicted in FIG. 3B) node/device. It may be desirable to be able to delegate key information delivery to a trusted key management service (KM). In the following, three exemplary embodiments for RI delegation from user A device D400 to KM D300 are described referring to FIG. 4 providing a graphical visualization of corresponding actions.

In a first embodiment (1), User A device D400 triggers KM D300 to host the access key. First, User A device D400 sends a trigger message to KM (see reference numeral 31). KM D300 replies with a request for the access key (see reference numeral 32). User A D400 then sends the access key key$_{KM}$ (optionally but preferably) encrypted for KM D300 (using identity based encryption, or PKI, or any other encryption method, as mentioned above, wherein encryption of the access key enhances security but is not mandatory). Also policies may be provided to the KM D300, for instance in conjunction with a step indicated with reference numeral 33. Alternatively or in addition, the KM D300 may have own policies for an access key. If the access key is encrypted, it can be decrypted by the KM D300. In a further step, User A device D400 or KM D300 publishes KM D300 as alternative or exclusive RI for ID$_A$ (see reference numeral 35).

Figure 4:
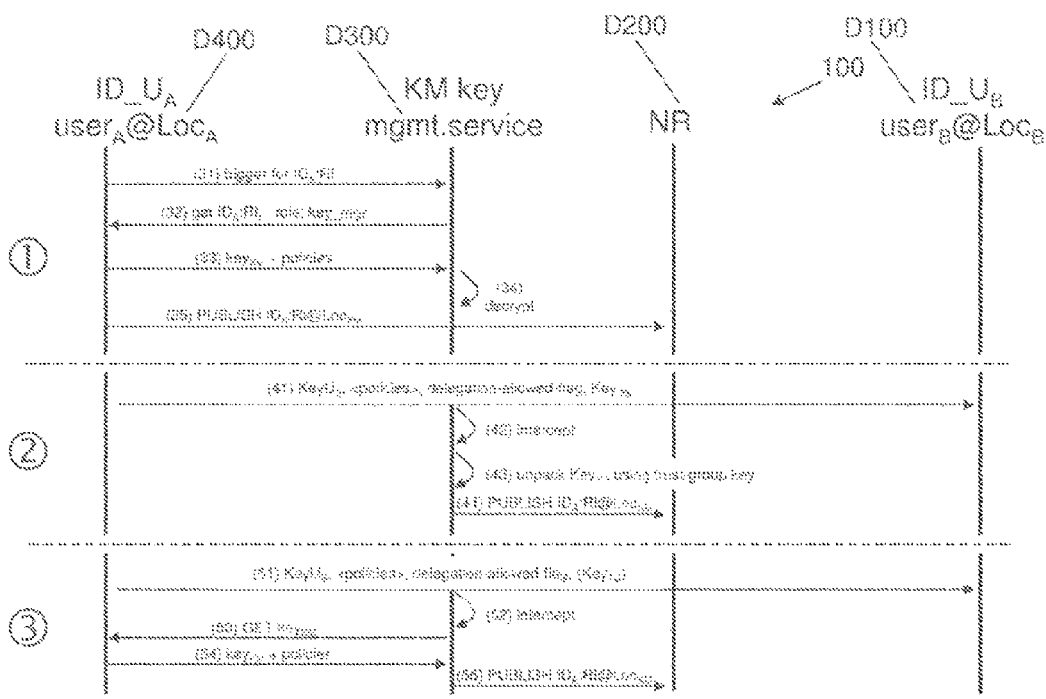
FIG. 4 illustrates examples for delivery of encrypted information object and access key using a key management service according to exemplary embodiments of the invention.

In a second embodiment (2), when User A device D400 wants a KM D300 (service) to take the role of RI besides itself, it may, when distributing an access key to a User B device D100 (i.e. KeyU$_B$), mark a key information message with a flag that authorizes traversed KMs D300 to intercept the message (compare delegation-allowed flag in FIG. 4, see reference numerals 41, 42). The message further comprises the access key encrypted with a trust-group key (the access key encrypted with the trust-group key is denoted by Key$_{TG}$ in FIG. 4) and preferably a set of policies that describe how access requests shall be handled. The trust-group key is known to a group of trusted KMs D300. An example is a key that is known to all KMs D300 (for instance a private part of a public-private key pair) run by a specific party, for instance a company. At least one KM D300 can then intercept the message of step 41 as indicated with reference numeral 42. Using the trust-group key, KM D300 can decrypt the protected access key (see reference numeral 43). In the following, KM D300 can then distribute the access key on behalf of User A as for instance described in conjunction with FIG. 3A or FIG. 3B, based on the previously received policies. KM D300 can further register (using a PUBLISH message) with at least NR D200, so that subsequent key information requests are alternatively or exclusively directed to KM D300 (see reference numeral 44).

In a third embodiment (3) shown in FIG. 4 as well, when User A device D400 wants a KM D300 (service) to take the role of RI besides itself, it may, when distributing an access key to a User B device D400 (i.e. KeyU$_B$), mark a key information message with a flag that authorizes traversed KMs to intercept the message (see reference numeral 51). At least one KM D300 can then intercept the message (see reference numeral 52) and request the access key from User A (see reference numeral 53), for instance in case no trust-group encrypted access key Key$_{TG}$ is present in message 51 or the Key$_{TG}$ is not decryptable or for other reason, User A device D400 sends the (optionally but preferably protected) access key, typically together with policies governing the use of the access key, to KM D300, here depicted as KM-specific encrypted access key key$_{KM}$, see reference numeral 54. After decrypting the key key$_{KM}$, KM D300 can then distribute the access key, by encrypting it in the same way as User A device D400 would do upon receiving key information requests. KM D300 or User A also registers KM D300 with NR D200 (using a PUBLISH message), so that subsequently key information requests can alternatively or exclusively be directed to KM D300 (see reference numeral 55).

The various embodiments may co-exist in a communication network.

Embodiments (2) and (3) shown in FIG. 4 make use of a delegation indicator, here embodied in a "delegation-allowed-flag". A delegation indicator authorizes a trusted key issuing node to intercept said message meaning that a trusted key issuing node can intercept the message and the delegation indicator indicates that the trusted key issuing node can further inspect the message for information relating to an obtaining of the access key. This information can be the access key itself as in embodiment (2) of FIG. 4 (access key still encrypted by Key$_{TG}$) or information pointing to a node from which the trusted key issuing node can receive the access key as in embodiment (3) of FIG. 3. A trusted key issuing node is a node that is trusted by other nodes in the network, especially by a publishing initiation node. Hence, usage of a delegation indicator avoids that a trusted key issuing node has to completely scan each and every intercepted message for access key related information. Interception of a message and further inspection triggered by detection of a delegation indicator thus enables a very efficient key delegation without knowing and explicitly addressing a key issuing node.

The key information may be bundled with policies. Those may typically include information on what User B is allowed to do and/or not to do with the information contained in the information object, similar to a rights expression in a DRM system. This rights expression can be expressed using machine readable text formats for instance XML, or it could be encoded into a state machine, executable or similar.

One possible embodiment is to split the key into several parts and let several KMs manage the parts, i.e. each part is managed by one KM. This may have the advantage that each KM does not have to be fully trusted. It may require resolution to multiple KMs per object ID and retrieval of several key parts.

For example, the access key may be split in for instance N parts. User A device publishes the locations of the N parts at N key issuing nodes at the NR. When user B device requests the location of the key issuing node for the access key at NR (RESOLVE $ID_A$:RI), then NR sends $Loc_{KM(i)}$ with i=1 ... N to user B device and $Loc_{KM(i)}$=location pointer information of ith key issuing node. The user B device sends GET $ID_A$: RI@$Loc_{KM(i)}$ for i=1 ... N to the corresponding N key issuing nodes. The user B device then receives the N parts of the access key from the N key issuing nodes and assembles the access key accordingly, for instance following an assembly instruction available to the user B device or common assembly standard solution for splitted access keys.

Figure 5:
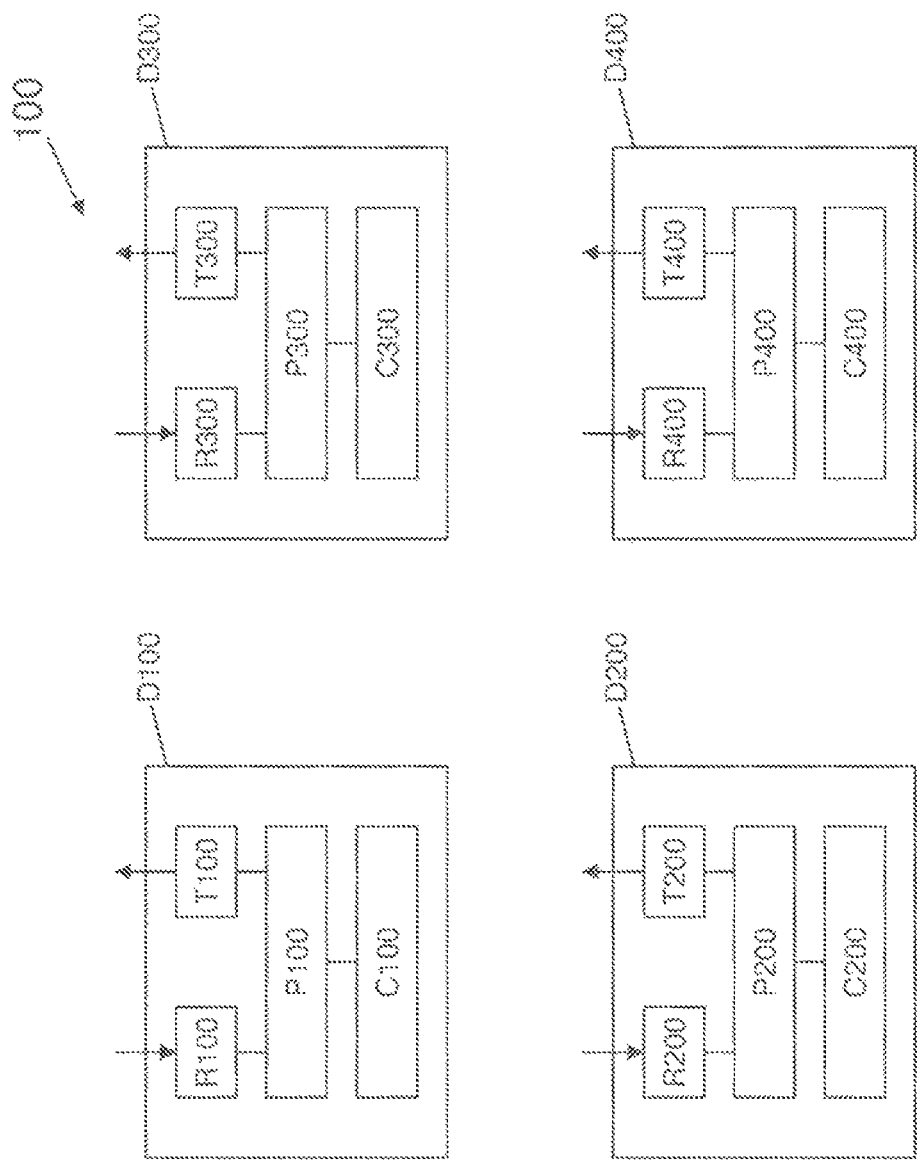
FIG. 5 illustrates constitution of a node receiving and decrypting an encrypted information object, of a resolution node, of a key issuing node, and of a publishing initiation node of a network of information system according to an exemplary embodiment of the invention.
Figure 7:
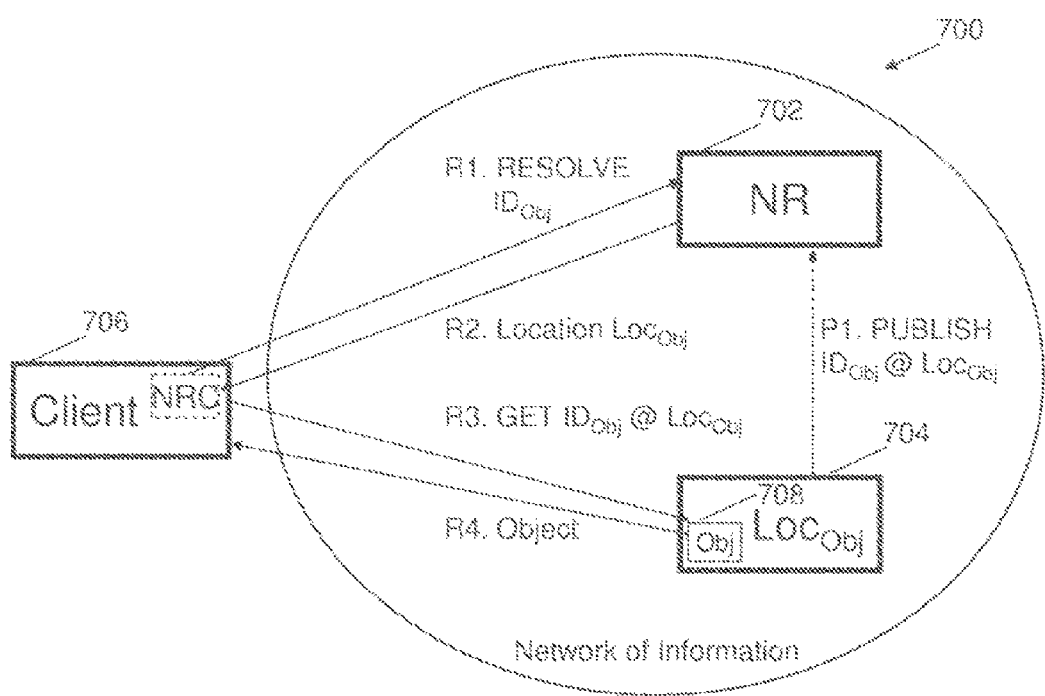
FIG. 7 illustrates publishing and retrieving information in a network of information system.

FIG. 5 schematically illustrates constitution of the nodes D100, D200, D300 and D400.

Information object requesting node D100 may comprise a receiving unit R100, a transmission unit T100, a processing unit P100 and a storage unit C100. The resolution node D200 may also comprise a receiving unit R200, a transmission unit T200, a processing unit P200 and a storage unit C200. Also the key issuing node D300 may comprise a receiving unit R300, a transmission unit T300, a processing unit P300 and a storage unit C300. In a similar manner, publishing initiation node D400 may also comprise a receiving unit R400, a transmission unit T400, a processing unit P400 and a storage unit C400.

In a method for controlling information object usage in a network of information wherein information objects are identified by information object identities and locations of the information objects are indicated by location pointing information, an information object requesting node (e.g. such as node D100) may be employed. A receiving unit (e.g. such as R100) may be adapted to receive an encrypted information object. A transmission unit (e.g. such as T100) may be adapted to send to a resolution node a request for location pointing information of a key issuing node, the request comprising an identity of the received information object. The receiving unit may be further adapted to receive the location pointing information of the key issuing node and the transmission unit to send to the key issuing node a request for an access key for decrypting the encrypted information object, the request comprising the identity of the received information object. In addition, the receiving unit may be adapted to receive the access key, and a processing unit (e.g. such as P100) may be adapted to decrypt the received encrypted information object with the received access key.

In a method for controlling information object usage in a network of information wherein information objects are identified by information object identities and locations of the information objects are indicated by location pointing information, a resolution node (e.g. such as D200) may be employed. A receiving unit (e.g. such as R200) may be adapted to receive a publishing of location pointing information of a key issuing node from which an access key for decrypting an encrypted information object can be received from, the access key being related to an identity of the information object and to receive a request for location pointing information of the key issuing node, the request comprising the identity of the information object. A processing unit (e.g. such as P200) may be adapted to obtain the location pointing information of the key issuing node based on the received identity and the relation. For example, the processing unit may be adapted to obtain the location pointing information from a storage unit (e.g. such as C200). A transmission unit (e.g. such as T200) may be adapted to send the location pointing information of the key issuing node.

In a method for controlling information object usage in a network of information wherein information objects are identified by information object identities and locations of the information objects are indicated by location pointing information, a key issuing node (e.g. such as node D300) may be employed. A receiving unit (e.g. such as R300) may be adapted to receive a request for an access key for decrypting an encrypted information object, the request comprising an identity of the information object. A processing unit (e.g. such as P300) may be adapted to obtain the access key based on the received identity (e.g. from a storage unit such as C300) and a transmission unit (e.g. such as T300) may be adapted to send the access key.

In a method for controlling information object usage in a network of information wherein information objects are identified by information object identities and locations of the information objects are indicated by location pointing information, a publishing initiation node (e.g. such as node D400) may be employed. A processing unit (e.g. such as P400) may be adapted to initiate a publishing of location pointing information of a key issuing node. The key issuing node is a node from which an access key for decrypting an encrypted information object can be received from. The access key is related to an identity of the information object. The location pointing information may be retrieved from a storage unit (e.g. such as C400) and may be published via a transmission unit (e.g. such as T400).

The object requesting node (e.g. such as node D100), the resolution node (e.g. such as D200), the key issuing node (e.g. such as node D300), and the publishing initiation node (e.g. such as node D400) as well as their respective units (e.g. such as illustrated in FIG. 5) may be adapted to carry out further steps of the methods described herein. The object requesting node (e.g. such as node D100), the resolution node (e.g. such as D200), the key issuing node (e.g. such as node D300), and the publishing initiation node may be individual stand-alone devices or may share at least in part common units or devices. The same may apply for their respective units.

FIG. 6A to FIG. 6D illustrates procedures of operating the network of information 100 according to an exemplary embodiment of the invention.

FIG. 6A relates to an operation mode of the node D100, FIG. 6B relates to an operation mode of node D200, FIG. 6C relates to an operation mode of node D300 and FIG. 6D relates to an operation mode of node D400. Although not shown in FIG. 6A to FIG. 6D, the individual procedures of the nodes D100, D200, D300, D400 are interconnected in a manner as shown, for instance in FIG. 1 or FIG. 3A.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for controlling information object usage in a network of information wherein information objects are identified by information object identities and locations of the information objects are indicated by location pointing information, the method comprising:
   receiving an encrypted information object at a first node;
   sending, to a resolution node, a request for location pointing information of a key issuing node, the request comprising an identity of the received encrypted information object;
   receiving the location pointing information of the key issuing node at the first node;
   sending to the key issuing node a request for an access key for decrypting the encrypted information object, the request comprising the identity of the received encrypted information object;
   receiving the access key at the first node; and
   decrypting the received encrypted information object with the received access key to generate a decrypted information object.

2. The method according to claim 1, wherein the received access key is encrypted with a key encryption key, the method further comprising
   obtaining the key decryption key; and
   decrypting the encrypted access key with the key decryption key.

3. The method according to claim 2, further comprising sending to the key issuing node at least one parameter for a generation or an identification of the key encryption key.

4. The method according to claim 1, further comprising sending to the key issuing node at least one parameter for an authorization of an entity associated with a node receiving and decrypting the encrypted information object.

5. The method according to claim 1, further comprising
   receiving, at the first node, policy information indicating at least one usage right of the decrypted information object; and
   using the decrypted information object according to the received at least one usage right.

6. A method for controlling information object usage in a network of information wherein information objects are identified by information object identities and locations of the information objects are indicated by location pointing information, the method comprising:
   receiving, at a first node, a publishing of location pointing information of a key issuing node from which an access key for decrypting an encrypted information object can be received from, the access key being related to an identity of the encrypted information object;
   receiving, at the first node, a request for location pointing information of the key issuing node, the request comprising the identity of the encrypted information object;
   obtaining the location pointing information of the key issuing node based on the received identity and the relation; and
   sending the location pointing information of the key issuing node.

7. A method performed at a key issuing node for controlling information object usage in a network of information wherein information objects are identified by information object identities and locations of the information objects are indicated by location pointing information, the method comprising:
   receiving, at the key issuing node and from a first node, a request for an access key for decrypting an encrypted information object, the request comprising an identity of the encrypted information object provided to the first node by a resolution node, the first node comprising an information object requesting node, and the key issuing node being identified by the location pointing information provided to the information object requesting node by the resolution node;
   obtaining, at the key issuing node, the access key based on the received identity;
   sending the access key from the key issuing node to the first node
   wherein a second node comprises a publishing initiation node configured to initiate a publishing of location pointing information of the key issuing node, and wherein the key issuing node is separate from the publishing initiation node;
   receiving a request for an access key issuing delegation from the publishing initiation node;
   sending a request for the access key to the publishing initiation node; and
   receiving the access key from the publishing initiation node.

8. The method according to claim 7, the method further comprising
   obtaining a key encryption key; and
   encrypting the access key with the key encryption key.

9. The method according to claim 8, further comprising receiving from the first node at least one parameter for a generation or an identification of the key encryption key.

10. The method according to claim 7, further comprising receiving from the first node at least one parameter for an authorization of an entity associated with the node receiving and decrypting the encrypted information object.

11. The method according to claim 7, further comprising intercepting a message from the publishing initiation node, the message comprising the access key for the encrypted information object; and obtaining the access key from the intercepted message.

12. The method according to claim 11, wherein said message comprises a delegation indicator authorizing a trusted key issuing node to intercept said message.

13. The method according to claim 7, further comprising intercepting a message from the publishing initiation node, the message comprising location pointing information identifying the publishing initiation node; sending a request for the access key to the publishing initiation node; and receiving the access key from the publishing initiation node.

14. The method according to claim 13, wherein said message comprises a delegation indicator authorizing a trusted key issuing node to intercept said message.

15. The method according to claim 7, wherein the received access key is encrypted with a key encryption key related to a key decryption key available to the key issuing node.

16. The method according to claim 7, further comprising sending location pointing information of the key issuing node and the identity of the information object to a resolution node.

17. A method performed at a publishing initiation node for controlling information object usage in a network of information wherein information objects are identified by information object identities and locations of the information objects are indicated by location pointing information, the method comprising:

initiating a publishing of location pointing information of a key issuing node, the key issuing node being a node from which an access key for decrypting an encrypted information object can be received from, the access key being related to an identity of the encrypted information object, wherein the key issuing node is separate from the publishing initiation node;

sending a request for the access key issuing delegation to the key issuing node;

receiving a request for the access key from the key issuing node; and sending the access key to the key issuing node.

18. The method according to claim 17, wherein initiating the publishing comprises sending a message.

19. The method according to claim 18, wherein the message comprises the location pointing information and the identity.

20. The method according to claim 18, wherein the message comprises the access key.

21. The method according to claim 20, wherein the access key is encrypted with a key encryption key related to a key decryption key available to the key issuing node.

22. The method according to claim 18, wherein the message comprises a delegation indicator authorizing a trusted key issuing node to intercept said message.

23. The method according to claim 17, the method further comprising sending the encrypted information object.

24. A node configured to control information object usage in a network of information wherein information objects are identified by information object identities and locations of the information objects are indicated by location pointing information, the node comprising:

a receiving unit configured to receive an encrypted information object;

a transmission unit configured to send to a resolution node a request for location pointing information of a key issuing node, the request comprising an identity of the received encrypted information object;

wherein the receiving unit is further configured to receive the location pointing information of the key issuing node;

wherein the transmission unit is further configured to send to the key issuing node a request for an access key for decrypting the encrypted information object, the request comprising the identity of the received encrypted information object;

wherein the receiving unit is further configured to receive the access key; and a processing unit configured to decrypt the received encrypted information object with the received access key to generate a decrypted information object.

25. A node configured to control information object usage in a network of information wherein information objects are identified by information object identities and locations of the information objects are indicated by location pointing information, the node comprising:

a receiving unit configured to:

receive a publishing of location pointing information of a key issuing node from which an access key for decrypting an encrypted information object can be received from, the access key being related to an identity of the encrypted information object;

receive a request for location pointing information of the key issuing node, the request comprising the identity of the encrypted information object;

a processing unit configured to obtain the location pointing information of the key issuing node based on the received identity and the relation; and a transmission unit configured to send the location pointing information of the key issuing node.

26. A key issuing node configured to control information object usage in a network of information wherein information objects are identified by information object identities and locations of the information objects are indicated by location pointing information, the key issuing node being identified by the location pointing information provided to a first node by a resolution node, the key issuing node comprising:

a receiving unit configured to receive, from the first node, a request for an access key for decrypting an encrypted information object, the request comprising an identity of the encrypted information object provided to the first node by the resolution node, the first node comprising an information object requesting node;

a processing unit configured to obtain the access key based on the received identity; and a transmission unit configured to send the access key to the first node;

wherein a second node comprises a publishing initiation node configured to initiate a publishing of location pointing information of the key issuing node, and wherein the key issuing node is separate from the publishing initiation node;

the receiving unit further configured to receive a request for an access key issuing delegation from the publishing initiation node;

the transmission unit further configured to send a request for the access key to the publishing initiation node; and the receiving node further configured to receive the access key from the publishing initiation node.

27. A publishing initiation node configured to control information object usage in a network of information wherein information objects are identified by information object identities and locations of the information objects are indicated by location pointing information, the node comprising:

a processing unit configured to initiate a publishing of location pointing information of a key issuing node, the key issuing node being a node from which an access key for decrypting an encrypted information object can be received from, the access key being related to an identity of the encrypted information object, wherein the key issuing node is separate from the publishing initiation node;

a transmission unit configured to send a request for the access key issuing delegation to the key issuing node;

a receiving unit configured to receive a request for the access key from the key issuing node; and the transmission unit further configured to send the access key to the key issuing node.

* * * * *